United States Patent

Drouet et al.

[11] Patent Number: 6,159,269
[45] Date of Patent: Dec. 12, 2000

[54] RECOVERY OF METAL FROM DROSS AND APPARATUS THEREFORE

[75] Inventors: Michel G. Drouet, Montreal; Peter G. Tsantrizos, Westmount, both of Canada

[73] Assignee: Pyrogenesis Inc., Montreal, Canada

[21] Appl. No.: 09/155,582

[22] PCT Filed: Apr. 10, 1997

[86] PCT No.: PCT/CA97/00242

§ 371 Date: Sep. 29, 1998

§ 102(e) Date: Sep. 29, 1998

[87] PCT Pub. No.: WO97/39155

PCT Pub. Date: Oct. 23, 1997

Related U.S. Application Data

[60] Provisional application No. 60/015,470, Apr. 15, 1996.

[51] Int. Cl.[7] .................................................. C22B 21/00
[52] U.S. Cl. .................................................. 75/672; 266/87
[58] Field of Search .................................. 75/672; 266/87

[56] References Cited

U.S. PATENT DOCUMENTS

| | | | |
|---|---|---|---|
| 4,952,237 | 8/1990 | Dube et al. | 75/10.19 |
| 5,245,627 | 9/1993 | Drouet | 373/20 |
| 5,308,375 | 5/1994 | Lindsay | 75/10.21 |
| 5,421,850 | 6/1995 | Dube | 75/672 |
| 5,447,548 | 9/1995 | Lindsay | 75/10.21 |

FOREIGN PATENT DOCUMENTS

| | | |
|---|---|---|
| 2116249 | 8/1995 | Canada . |
| 0690139 | 1/1996 | European Pat. Off. . |
| WO9209708 | 6/1992 | WIPO . |
| WO9317135 | 9/1993 | WIPO . |
| WO9523239 | 8/1995 | WIPO . |

OTHER PUBLICATIONS

Michel G. Drouet et al., Proceedings of the International Symposium on Environmental Technologies: Plasma Systems and Applications, vol. II Oct. 8–11 1995, p. 546, Altanta, Georgia, USA.

Peter Whiteley et al., The Alcan Process for Inert Gas Dross Cooling Feb. 1991, pp. 52–53, Journal of Metals.

Primary Examiner—Melvyn Andrews
Attorney, Agent, or Firm—George J. Primak

[57] ABSTRACT

A process and an apparatus are disclosed for improved recovery of metal from dross, wherein a dross treating furnace is provided with a refractory wall or lining with good capacity to store and conduct heat. This furnace is preheated to a desired temperature by injection of oxygen to burn non-recoverable metal remaining in the residue after tapping of the recoverable metal contained in the dross. When dross is treated in such preheated furnace, the heat emanating by conduction from the furnace wall is sufficient to melt and separate the recoverable metal contained in the dross, without addition of an external heat source, such as fuel or gas burners, plasma torches or electric arcs.

15 Claims, 2 Drawing Sheets

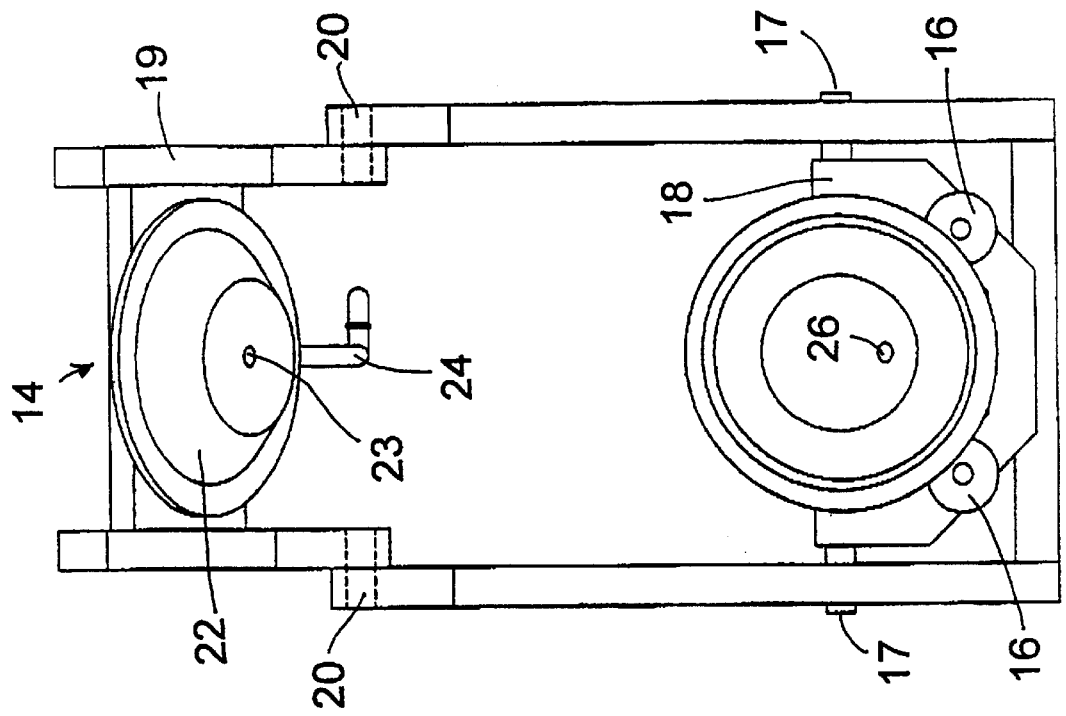
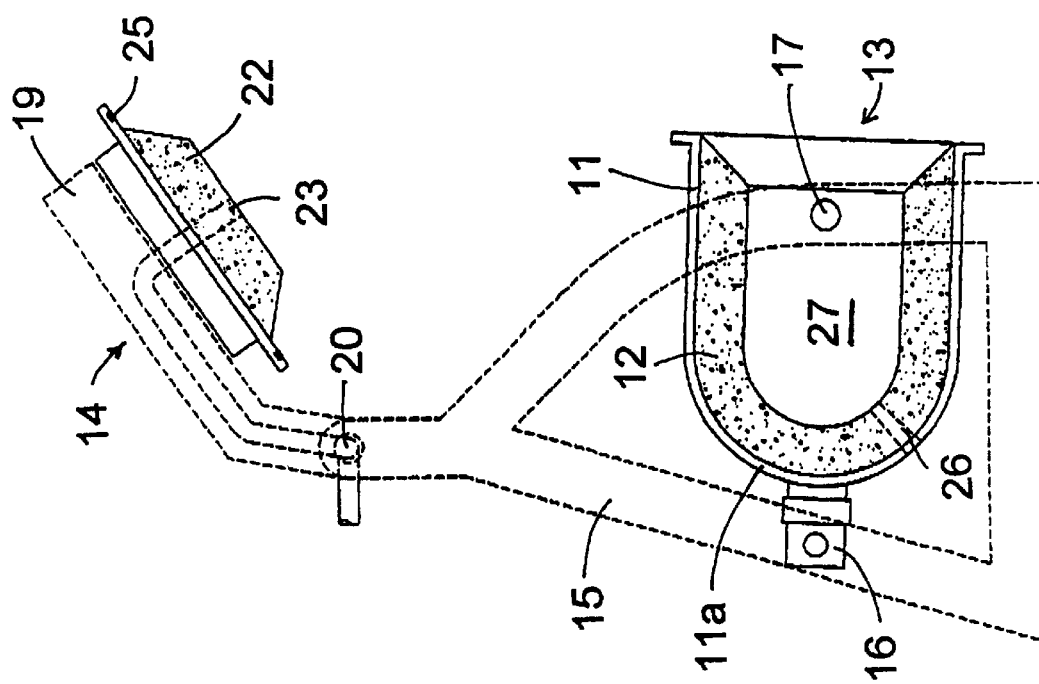

RECOVERY OF METAL FROM DROSS AND APPARATUS THEREFORE

This application is a International 371 of PCT/CA97/00242, filed Apr. 10, 1997 and also claims benefit of U.S. Provisional No. 60/015,470 filed Apr. 15, 1996.

BACKGROUND OF THE INVENTION

1. Field of the Invention

This invention relates to the recovery of non-ferrous metals, such as aluminum, from dross.

2. Brief Description of the Prior Art

Dross is a material which forms on the surface of molten non-ferrous metal, such as aluminum or zinc, during remelting, metal holding and handling operations when the molten metal is in contact with a reactive atmosphere. Dross normally consists of metal oxides entraining a considerable quantity of molten free (unreacted) metal, and for economic reasons it is desirable to extract the free metal before discarding the residue. Recovery can be carried out by treating the dross in a furnace at a high temperature. For this purpose, several furnaces have been devised and are presently being used; such furnaces are normally heated with an external heat source, such as fuel- or gas-operated burners, plasma torches, or electric arcs.

In aluminum processing-operations, for example, the dross, which normally contains at least 50% Al metal, is skimmed-off from the surface of the molten metal in a smelting or similar furnace and is usually loaded into special containers or pans where it is cooled and then it is stored, before being processed in a dross treating furnace which, as mentioned above, is heated with an external heat source.

The use of fuel- or gas-operated burners for heating the dross in a dross treating furnace, in order to recover the aluminum contained therein, has the major drawback of requiring the addition of salt fluxes such as NaCl or KCl, used to increase the percentage of aluminum recovery. Apart from the fact that such salt fluxes increase the cost of the operation, they also lead to increased pollution and are, therefore, environmentally undesirable.

The use of a plasma torch as, for instance, disclosed in U.S. Pat. No. 4,952,237 of Aug. 28, 1990, or of an electric arc as disclosed in U.S. Pat. No. 5,245,627 of Sep. 14, 1993 permits the above mentioned drawback to be overcome. Indeed, the use of plasma or arcs creates higher temperatures in the furnace and thus avoids the necessity of adding salt fluxes. However, both technologies use electricity which in many cases may be more expensive than using fuel or gas heating. Furthermore, the use of plasma or arc requires a significant capital investment in power supplies, controller and other related equipment.

As mentioned in U.S. Pat. No. 4,952,237, it has also been proposed to extract the liquid metal from dross by mechanical compression of the hot dross removed directly from a furnace. Such process requires expensive equipment and high dross temperatures and is limited by these factors to relatively large scale operations. Moreover, such approach does not directly address the disposal problems because the residues will still contain a large quantity of free metal.

It has also been proposed in the case of aluminum dross to induce and maintain burning or thermitting of the dross under controlled conditions by working the dross in an inclined rotary barrel open to the atmosphere or subjected to oxygen injection as disclosed, for example, in U.S. Pat. No. 5,447,548, of Sep. 5, 1995. This permits a certain portion of the metal content to be consumed in order to recover the remainder. This method has the drawback of resulting in poorer metal recovery as some of the metal is burned to provide the heat required for the process.

In U.S. Pat. No. 5,308,375 of May 3, 1994, the furnace heating by a plasma torch is followed by oxygen injection prior to metal tapping. This results in a direct heating of the charge during the separation process which, according to this patent, results in a significant reduction of the plasma power time and of the total cycle time. However, such procedure will undoubtably result in combustion of some of the recoverable metal separated from the dross.

In Canadian Patent Application No. 2,116,249, a gas or fuel burner is used to heat the charge. When the charge reaches a certain temperature, an oxidizing agent such as oxygen is injected onto the charge in the belief that only the unrecoverable finest aluminum particles would be combusted in providing heat for the process. This opinion is shared by U.S. Pat. No. 5,308,375 mentioned above. In both of these processes, oxygen is injected prior to metal tapping in the belief that the recoverable metal would not react with the oxygen and therefore the metal recovery rate would not be affected. No data is presented to support this contention. However, comparative tests conducted at the Hydro-Quebec Research Laboratory on several hundred tonnes of aluminum drosses have shown that dross treatment in an inert atmosphere such as argon produced a metal recovery rate higher by as much as 7% than the treatment conducted in open air; this data (published in "Proceedings of the International Symposium on Environmental Technologies: Plasma Systems and Applications", Volume II, Oct. 8–11, 1995, Atlanta, Ga., U.S.A., p.546) indicates that the recovery rate is likely to be affected by injection of an oxidizing agent onto the charge itself, before tapping the metal.

OBJECTS AND SUMMARY OF THE INVENTION

It is an object of the present invention to obviate the disadvantages of prior processes and apparatus and to provide an improved process and apparatus for recovering non-ferrous metals, and particularly aluminum, from drosses containing the same.

In essence the process according to the present invention for treating a dross containing a recoverable metal, such as aluminum, in order to recover this metal, comprises the following steps:

(a) charging a batch of hot dross into a furnace preheated to a high enough temperature to insure that said dross is thereby heated above the melting point of the metal to be recovered by transfer of energy stored in the furnace wall;

(b) providing an inert atmosphere in the furnace by filling the furnace with inert gas, to prevent oxidation of the hot dross;

(c) rotating or oscillating the hot dross within the preheated furnace to insure proper heating of the dross to a temperature above the melting point of the metal to be recovered and agglomeration of recoverable free metal at the bottom of the furnace;

(d) removing from the furnace the recoverable free metal while leaving inside the furnace oxide residues and a fraction of non-recoverable metal which stays with said residues as it cannot be recovered;

(e) thereafter, injecting a controlled amount of an oxidizing gas, such as oxygen, into the furnace while rotating or oscillating the furnace, so as to oxidize sufficient non-recoverable metal within the oxide residues and through resulting exothermic oxidation reaction to evenly transfer to the furnace wall sufficient energy to preheat the furnace to a temperature suitable for treating a new batch of hot dross;

(f) removing solid residues remaining in the furnace; and (g) charging into the furnace the new batch of hot dross and repeating the process.

It should be mentioned that for the very first charge, the furnace will be preheated with an external heat source, such as a gas burner, but this is only required when initially starting the operation; the remaining preheatings are done in-situ through the exothermic oxidation reaction of non-recoverable metal present in the residues. The controlled amount of oxygen injected to carry out the exothermic oxidation reaction is normally introduced into the reactor at a controlled rate to burn sufficient non-recoverable metal to preheat the furnace to a predetermined temperature, which will be such as to compensate for the furnace heat loss produced mainly when the solid residues are removed and the new batch of hot dross is charged.

The novel process may be carried out in a closable rotary or oscillatory furnace, the rotation or oscillation of which may be within a range of 1 to 20 turns or swings per minute and such rotation or oscillation may be carried out in a continuous or intermittent manner. The furnace is provided with a refractory wall which has a capacity to store and accumulate heat as well as provide heat conduction to the dross charge being treated. Once the operation has commenced, use of fuel or gas burners, plasma torches, or electric arcs is not required. Furthermore, combustion of recoverable metal is essentially avoided, allowing for a higher recovery of metal, since in the present invention, the furnace wall or lining is preheated by combustion of the non-recoverable metal contained in the residues following the tapping of the recoverable metal. It should be noted that U.S. Pat. No. 4,952,237 also considers the treatment of the residues by addition of various oxides or injection of water vapour or oxygen, air, or other oxygen-containing gas in order to eliminate the nitrides and stabilize the fluoride residues, the fluorides being converted into insoluble calcium and magnesium fluorides. However, the objective of such treatment of the residue is not to provide processing energy as is the case in the present invention and it is, therefore, totally different. Furthermore, the energy produced by the process disclosed in U.S. Pat. No. 4,952,237 is not sufficient to treat the cold dross being treated by that process.

In the present invention oxygen is injected after tapping of the metal to make sure that only unrecoverable metal is burned and furthermore the heat is transferred to the furnace wall to be used for heating the next dross charge. Thus, combustion of recoverable metal is avoided by tapping the metal first, before injection of the oxidizing agent on the residue, thereby preserving the highest metal recovery rate. However, in some exceptional circumstances it is also possible to inject a controlled amount of oxidizing gas into the furnace just prior to removing the recoverable free metal in order to provide a controlled oxidation of some free metal and thereby increase the temperature in the furnace if and when required.

It is also preferable to maintain a slight overpressure of inert gas, such as argon, during the steps (a), (b), (c) and (d) described above, to prevent any air inflow into the furnace chamber, and also in (f) to prevent burning the residues during their discharge from the furnace.

BRIEF DESCRIPTION OF THE DRAWINGS

The invention will further be described with reference to the accompanying drawings in which:

FIG. 3 is a side view of the furnace in the emptying mode; and

FIG. 4 is a front view of the furnace in the emptying mode.

DETAILED DESCRIPTION OF THE INVENTION

In the various figures, the same reference numbers are used to describe the same parts.

Figure 2:
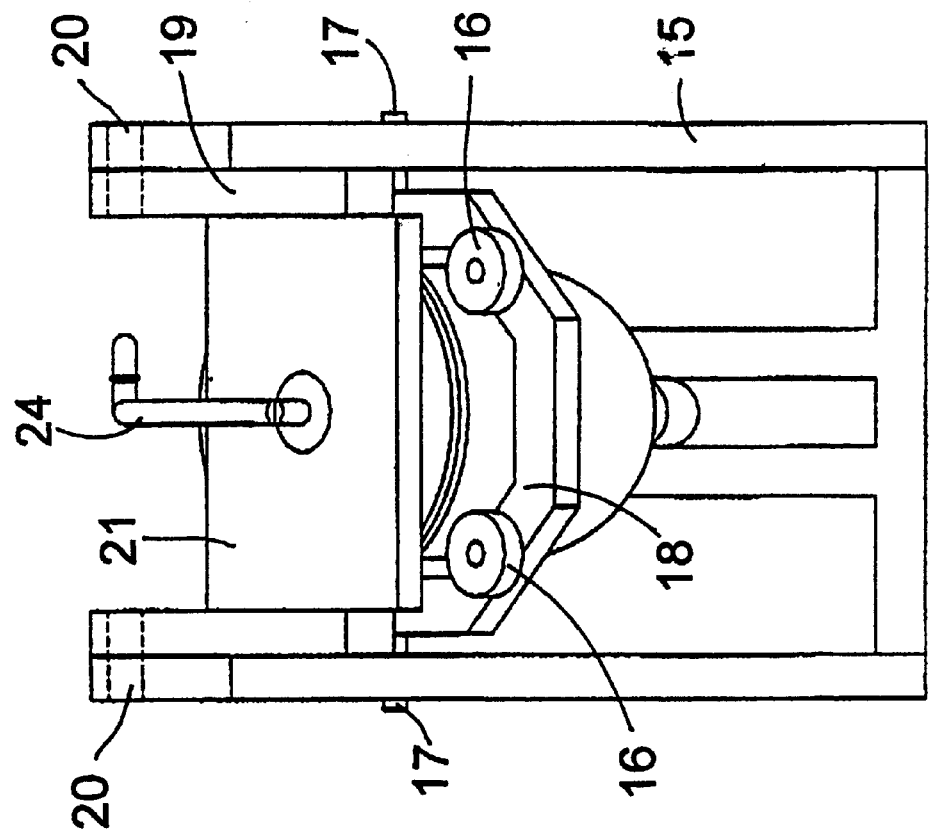
FIG. 2 is a front view of the furnace in the run mode.
Figure 1:
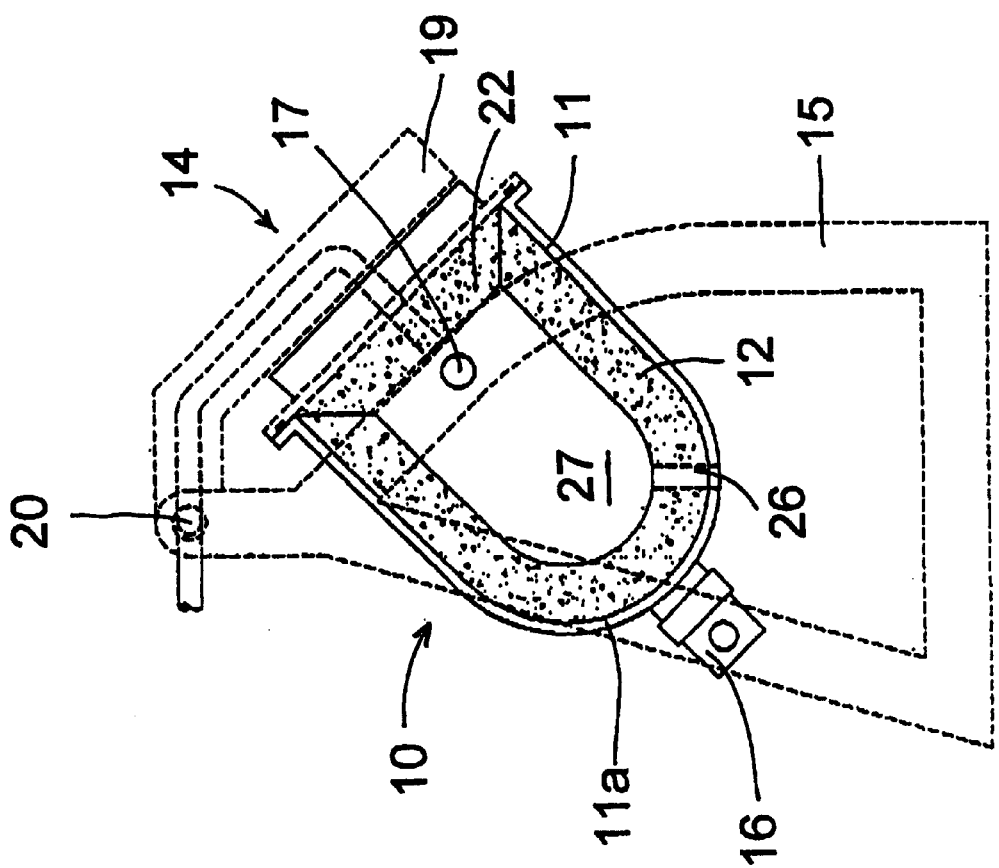
FIG. 1 is a side view of a rotary furnace in the run mode.

A furnace 10 suitable for the purposes of the present invention is shown in the run mode in side view in FIG. 1 and in front view in FIG. 2 and similarly in the emptying mode in FIG. 3 and in FIG. 4. To show the positioning of the furnace more clearly, the framework 15 in FIG. 1 and FIG. 3 is drawn in broken lines. The furnace 10 comprises of a hollow steel cylinder 11 having its interior lined with a high temperature resistant refractory wall 12. As wall 12, one may use a high alumina castable refractory, such as the product sold under the trade name PLICAST AL TUFF 2001, manufactured by Didier, which has a good capacity to accumulate and conduct heat. It may also be desirable to insert a high specific heat capacity liner into the refractory wall, preferably near the internal surface of the furnace chamber, in order to store a higher density of heat in the furnace wall. Other suitable refractory wall or lining could be made of, for example, about 80% silicon carbide and about 20% glass-forming additives such as BaO, CaO or other metallic oxides. One such product is sold under the tradename CARBOFRAX II LIG, manufactured by Carborundum and containing 81% silicon carbide and 19% oxides. This product has a larger thermal conductivity and heat capacity than PLICAST AL TUFF 2001 and would, therefore, be particularly suitable for use as the wall or lining 12 in furnace 10 of the present invention.

One end of the cylinder 11 is closed by an end wall 11a while the other end has an opening 13 which is closable by a door mechanism shown generally as 14. The above structure forms an enclosed furnace chamber 27 for treatment of dross when the door mechanism 14 closes the opening 13.

The cylinder 11 is rotatable and tiltably supported by a framework 15. The framework allows the cylinder to rotate on its longitudinal axis on rollers and trunnion 16 and also permits it to tilt about pivot 17. The rotation is effected by a gear ring rigidly connected to the cylinder 11 and a chain which passes around the gear ring and is driven by a motor capable of rotating the cylinder either intermittently or continuously in either direction at speeds of up to 20 R.P.M. The arrangement of gear ring, chain and motor are conventional and are not shown in the drawings. Tilting may be effected by a hydraulic piston which moves cradle 18 within the framework 15.

The door mechanism 14 is supported by a framework 19 which can be tilted about pivots 20 with respect to the main framework 15. The door mechanism comprises a door mount 21 used to support a circular refractory lined door 22 so that the door can sit properly in the opening 13 of the cylinder 11 when the furnace is in the run mode. The door has a hole 23 which acts as a gas vent to permit escape of furnace gases to the exterior. The vent is covered by an exhaust conduit 24 enclosed within the door mount 21.

When the furnace is in the run mode, the refractory-lined door 22 can be lowered and allowed to sit on the cylinder 11. In the run mode, the refractory-lined door 22 rotates with the cylinder 11. Escape of gases between the periphery of the opening 13 and the door is prevented by a gasket 25. In the run mode, the door is normally held closed simply by the pressure due to its own weight; however, a latch (not shown) may also be provided to further compress the gasket 25. Controlled amount of inert gas, such as argon, or oxidizing gas, such as $O_2$, may be injected in the furnace using piping (not shown) mounted in the wall of the exhaust conduit 24 and a nozzle (not shown) located in the hole 23 of the door 22.

The apparatus described above is operated in the following manner:

The furnace 10 in the run position as illustrated in FIG. 1 has been preheated as a result of the exothermic oxidation of the non-recoverable metal remaining in the residues of the previous batch. This is done by injection of an oxidizing gas, such as oxygen, into the furnace 10 until a desired temperature is reached. The door 22 is seated on the cylinder 11 to prevent the energy stored in the refractory wall 12 to escape to the exterior. As already mentioned previously, when initially starting the furnace, it may be preheated using, for example, a gas burner. A hot dross charge is prepared in a charging device (not shown) adapted to allow charging of the furnace chamber when the cylinder is tilted upwardly as shown in FIG. 1 and FIG. 2. Before charging, argon may be introduced into the furnace chamber 27 to prevent combustion of the dross while it is being charged. Then, door 22 is opened and the charge of hot dross is dropped into the furnace chamber 27; in order to avoid damaging the refractory wall or lining 12 it may be desirable to tilt the furnace horizontally as shown in FIG. 3 and FIG. 4, in order to allow the charge to be pushed inside the furnace chamber 27 instead of being dropped in. The dross charge is such that is occupies about one quarter to one third of the total interior volume of the furnace chamber 27. The furnace cylinder 11, being in the run mode position (tilted upwardly), the door 22 is lowered to close tightly, compressing the gasket 25. The tilting angle of the cylinder is such that maximum use is made of the volume of the furnace chamber 27 without affecting the tumbling effect of the charge which is normally needed for maximum recovery of metal by agglomeration of the metal droplets contained in the dross.

Once the furnace door 22 is closed, argon is injected into the furnace chamber 27. The furnace is then either rotated or preferably oscillated in the case when large blocks of dross were charged, oscillation being preferred in that case to prevent damage to the refractory lining which could result from the tumbling of the heavy dross blocks within the furnace. The tumbling noise produced by the large blocks of dross may be monitored using a sound monitor mounted in the gas exhaust conduit 24 and full rotation of the furnace would only be allowed to proceed once the tumbling noise signal is below a predetermined level. As the furnace is rotated, heat transfer occurs between the dross charge and the preheated refractory wall 12 of the furnace. The temperature of the dross charge is monitored using a thermocouple also mounted in the gas exhaust conduit 24. Once the charge has reached a predetermined temperature as monitored by the thermocouple the separated molten metal is tapped off into a suitable crucible. Tapping is carried out through a taphole 26 located at the lowest point in furnace 10 when in the upward tilt position (FIG. 1). While tapping the furnace, the door remains sealed and the atmosphere in the furnace is an inert gas such as argon.

After the metal has been tapped, it is desirable to rotate the furnace 10 again for a certain period of time because repeated tests have shown that the solid residues floating on the molten metal bath remain wetted with appreciable amount of metal; in one example, following a first tapping of aluminum, the furnace was rotated for a further five minutes, allowing a second tapping of an amount of metal corresponding to more than 20% of the first tapping.

After the recoverable metal has been tapped, the taphole 26 is closed and a controlled amount of oxygen ($O_2$) is injected into chamber 27 of the furnace 10 through the nozzle located inside hole 23, in the door 22. Controlled oxidation of the non-recoverable metal contained in the residues is thereby produced; the temperature of the residues is monitored using the thermocouple mounted in the gas exhaust conduit 24. The furnace is rotated while the residues are reacting with the injected oxygen in order to evenly transfer the energy produced in the reaction to the furnace wall 12. Once the predetermined amount of oxygen has been injected, or if the temperature monitored by the thermocouple mounted in conduit 24 indicates a temperature value at or above a predetermined level, the injection of oxygen is stopped and the furnace is flooded with argon injected though the same nozzle as used for the injection of oxygen in order to stop the reaction. The furnace door 22 is then lifted, the furnace cylinder 11 is tilted forward as shown in FIG. 3 and the residues are discharged while rotating the furnace. It may be required to scrape the walls of the furnace if some residues are attached to the refractory. Once the residues have been discharged, the rotation is stopped, the furnace cylinder 11 is placed in the run position illustrated by FIG. 1, and the furnace door 22 is closed to prevent heat loss by radiation.

The invention is further illustrated by the following example:

EXAMPLE

A batch of hot aluminum dross weighing 700 kg is skimmed from an aluminum holding furnace. The dross, at that time at a temperature of approximately 700° C., is transferred in an open container towards the dross treating furnace for treatment. It is well known in the industry that hot drosses in contact with the atmosphere will burn, in fact technologies have been developed to slow down this combustion process, called thermitting. For example, Alcan is marketing a dross cooler where argon is injected in the dross container to prevent the contact of the dross with the ambient air (c.f. "The Alcan Process for Inert Gas Dross Cooling" in the Journal of Metals, Feb. 1991, pp. 52–53). In another example a thick blanket of salt is used to cover the dross. It is, therefore, unlikely that the dross will cool during the transfer in open air from the holding furnace where it is generated to the dross treating furnace where it is to be processed. However, it is also well known that the dross treating furnace, even preheated to the dross treatment temperature of 800° C., will lose energy. Measurements reported in publications such as "Proceedings of the International Symposium on Environmental Technologies", mentioned above, indicate that for a well designed furnace suitable to treat a batch of 870 kg of dross in 70 minutes, the energy efficiency is found to be 75% and thus the heat loss per unit weight of dross corresponds to approximately 25% of the specific energy required for melting the aluminum in the dross having a 50% metal content. This specific energy is approximately 0.246 kWh per kilogram of dross and, therefore, the furnace heat loss is approximately (0.246 kWh×25%)/75%=0.082 kWh per kilogram of dross treated.

This furnace heat loss is compensated in the case of the conventional dross treatment technologies using the heat produced by combustion of a fuel or that generated by a plasma torch or an electric arc. In the present invention the heat is produced by oxidation of part of the unrecoverable free metal contained in the residues of the previously treated batch of dross.

The amount of unrecoverable free metal which has to be oxidized to produce the required heat is calculated knowing the heat of oxidation of aluminum which is 8.7 kWh per kilogram of metal. In the case of our example, with 700 kg of dross, the total heat loss is, therefore, estimated at 700 kg×0.082 kWh/kg=57.4 kWh; this energy loss will be compensated by combustion of 57.4 kWh/8.7 kWh/kg=6.6 kg of unrecoverable metal in the residues.

It has been reported by many authors that the amount of unrecoverable metal remaining in the residues corresponds to approximately 6% of the amount recovered (c.f. for example "Proceedings of International Symposium on Environmental Technologies" refereed to previously) which in our example amounts to: 700 kg×50%×6%=21 kg. Therefore, in our example only a fraction of the free metal remaining in the residues needs to be oxidized in order to compensate for the furnace heat loss, that fraction amounting to 6.6/21=31%. Therefore, if the heat loss should prove to be higher than the amount considered here, there is a lot more potential energy stored in the residues to compensate for such eventuality. Such hot dross charge is, therefore, readily processed in accordance with the present invention.

In fact this invention would be particularly well adapted for "just in time" treatment of aluminum dross. When, for example, skimming of dross in an aluminum plant occurs every two hours, This dross, when skimmed, has a temperature of about 700° C. Such dross would be directly transferred in its hot state into a preheated furnace as described above. In accordance with the present invention, the furnace is preheated to about 1000° C. The furnace is rotated or oscillated so as to transfer energy into the dross and thereby heat it up above 700° C., thereby separating the recoverable aluminum from the residues, and tapping the recoverable metal from the furnace. All this is accomplished in about 1 hr. Finally, the furnace is preheated to about 1000° C. by injecting oxygen as described above and burning part of the aluminum remaining in the residues which are thereafter discharged from the furnace making it ready for the next charge. This is accomplished in another ½ hr, i.e the furnace is ready well before the time for the next batch of dross, so that the overall operation takes about 2 hrs, i.e. just in time for the next batch of dross skimmed in the aluminum plant.

Such "just in time" operation is extremely efficient since it considerably reduces capital and operating costs and requires no flux or salt addition, thereby decreasing pollution. Furthermore, the alloy recovered from the "just in time" treatment of the dross has the same composition as the alloy being produced at that time by the plant and can, therefore, be recycled into the holding furnace with no concern of contamination or variations of composition which are important concerns in the conventional dross treatment processes.

Finally, it should be mentioned that the above described preferred embodiments are in no way limitative and various modifications obvious to those skilled in the art can be made without departing from the spirit and scope of the present invention.

What is claimed is:

1. A process for treating dross containing a recoverable metal, in order to recover said metal, which comprises:
   (a) charging a batch of hot dross, resulting from skimming of said dross in a metallurgical plant, into a furnace preheated to a high enough temperature to insure that said dross is thereby heated above the melting point of the metal to be recovered by transfer of energy stored in the furnace wall;
   (b) providing an inert atmosphere in the furnace by filling the furnace with inert gas, to prevent oxidation of the hot dross;
   (c) rotating or oscillating the hot dross within the preheated furnace to insure proper heating of the dross to a temperature above the melting point of the metal to be recovered and agglomeration of recoverable free metal at the bottom of the furnace;
   (d) removing from the furnace the recoverable free metal while leaving inside the furnace oxide residues and a fraction of non-recoverable metal which stays with said residues as it cannot be recovered;
   (e) thereafter, injecting a controlled amount of an oxidizing gas into the furnace while rotating or oscillating the furnace, so as to oxidize sufficient non-recoverable metal within the oxide residues and through resulting exothermic oxidation reaction to evenly transfer to and store in the furnace wall sufficient energy to preheat the furnace to a temperature suitable for treating a new batch of hot dross resulting from a further skimming of the dross in the metallurgical plant;
   (f) removing solid residues remaining in the furnace; and
   (g) charging into the furnace the new batch of hot dross and repeating the process.

2. Process according to claim 1, in which the inert atmosphere is provided by filling the furnace with inert gas prior to charging the batch of hot dross.

3. Process according to claim 2, in which the inert gas is argon.

4. Process according to claim 1, in which the oxidizing gas is injected at a controlled rate.

5. Process according to claim 1, in which the oxidizing gas is oxygen.

6. Process according to claim 1, in which the oxidation reaction is stopped upon achieving satisfactory preheat of the furnace by injecting an inert gas into the furnace.

7. Process according to claim 6, in which the inert gas injected to stop the oxidation reaction is argon.

8. Process according to claim 1, in which there is provided a slight overpressure of inert gas to prevent any air inflow into the furnace.

9. Process according to claim 1, in which a controlled amount of oxidizing gas is also injected into the furnace just prior to removing free metal so as to provide a controlled oxidation of some free metal and thereby increase the temperature in the furnace when required.

10. Process according to claim 1, wherein the furnace is preheated with an external heat source only for treating the first charge, with all subsequent preheatings being done through the exothermic oxidation reaction within the furnace.

11. Process according to claim 1, in which the recoverable metal is aluminum.

12. Apparatus for recovering metal, such as aluminum, contained in a dross, which comprises:
   (a) a rotary or oscillatory furnace adapted for high temperature treatment of drosses, said furnace having a chamber with a refractory wall capable of accumulating and conducting heat provided by an exothermic reaction within said chamber, said refractory wall also being capable of storing a high density of heat suitable for heating a charge of dross above the melting point of the metal to be recovered, said furnace also having an opening through which dross may be charged into the chamber and solid residues discharged from said chamber, as well as a door for hermetically closing said opening during treatment of the dross, and said furnace further having a taphole for tapping recovered molten metal;

(b) means for rotating or oscillating said furnace;

(c) means for injecting an inert gas into said furnace;

(d) means for controllably injecting an oxidizing gas into said furnace; and (e) means for monitoring the temperature of the dross charge inside the furnace and of residues remaining in the furnace after tapping the recovered molten metal.

13. Apparatus according to claim 12, in which the refractory wall is provided with a high specific heat capacity liner to increase heat storage capacity of said wall.

14. Apparatus according to claim 12, further including means for monitoring the tumbling noise produced during rotation or oscillation of the furnace.

15. Apparatus according to claim 12, in which the furnace is also tiltable to facilitate charging and discharging of materials.

* * * * *